United States Patent
Nolan et al.

(10) Patent No.: US 6,401,161 B1
(45) Date of Patent: Jun. 4, 2002

(54) HIGH SPEED BUS INTERFACE FOR NON-VOLATILE INTEGRATED CIRCUIT MEMORY SUPPORTING CONTINUOUS TRANSFER

(75) Inventors: Shari J. Nolan, San Jose; Jeffery S. Nespor, Pleasanton; George W. Harris, Jr., Mountain View; Norman S. Dancer; Everett E. Groff, both of San Jose; James W. Frandeen, Soquel; Gregory Scott Triplett, Pleasanton, all of CA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 09/292,536

(22) Filed: Apr. 15, 1999

(51) Int. Cl.$^7$ .............................................. G06F 13/00
(52) U.S. Cl. ........................... 711/5; 711/154; 711/157; 711/167; 710/52; 710/129; 710/130; 365/230.03
(58) Field of Search ............................ 710/130, 52, 35; 711/5, 157, 167; 365/230.03, 230.04

(56) References Cited

U.S. PATENT DOCUMENTS

| | | | |
|---|---|---|---|
| 4,442,485 A | 4/1984 | Ota et al. | 364/200 |
| 4,599,689 A | 7/1986 | Berman | 364/200 |
| 5,459,850 A | 10/1995 | Clay et al. | 395/497.02 |
| 5,631,871 A | * 5/1997 | Park et al. | 365/203 |
| 5,822,251 A | 10/1998 | Bruce et al. | 365/185.33 |
| 5,956,743 A | 9/1999 | Bruce et al. | 711/103 |
| 6,000,006 A | 12/1999 | Bruce et al. | 711/103 |
| 6,081,878 A | 6/2000 | Estakhri et al. | 711/168 |

OTHER PUBLICATIONS

Article entitled "Excellerator FC Family Fibre Channel Solid State Storage Systems" by Solid Data Systems consisting of 2 pages.

Two pages from website entitled http://www.imperial-tech.com/cache.htm MegaCache High Capacity, Multi–Disk Caching System by Imperial Technology, Inc. dated Jan. 29, 2001.

Three pages from website entitled http://www.imperial-tech.com/ram.htm MegaRam Solid State Disks, by Imperial Technology, Inc. dated Jan. 29, 2001.

* cited by examiner

Primary Examiner—Do Hyun Yoo
Assistant Examiner—Jasmine Song
(74) Attorney, Agent, or Firm—Stephen A. Terrile; Hamilton & Terrile, LLP (57) ABSTRACT

An apparatus is described, comprising a plurality of banks, each bank having a number of columns of non-volatile storage units, each non-volatile storage unit having an input buffer for storing a page of data, the page having an input coupled to the input buffer accepting an input portion of data of a page at a memory speed, the non-volatile storage units storing the data from the input buffer within a memory write time; a plurality of interface buffers; an input bus having an input bus speed which is faster than the memory speed, the input bus being coupled to the plurality of interface buffers; a bus system, connecting each of the plurality of interface buffers to the non-volatile storage units of a column in each of the plurality of banks, supplying data from the plurality of interface buffers to the inputs of the non-volatile storage units at the memory speed.

18 Claims, 5 Drawing Sheets

HIGH SPEED BUS INTERFACE FOR NON-VOLATILE INTEGRATED CIRCUIT MEMORY SUPPORTING CONTINUOUS TRANSFER

BACKGROUND OF THE INVENTION

1. Field of the Invention

This invention relates to the management of interfaces between high speed buses and memory. In particular, the invention relates to an arrangement of non-volatile integrated circuit memory, such as flash memory, that supports operation with a high speed bus.

2. Description of the Related Art

Large scale data storage systems are being used in an increasing variety of settings. Thus, flexibility in the design of the access systems used with these systems is becoming Ad increasingly important. One approach to improving the flexibility which has evolved is called a storage area network SAN. In the SAN environment, heterogeneous storage systems are being deployed which allow for greater flexibility in the use and management of data. In a SAN, the storage systems are interconnected by high-speed communication channels, such as the fiber channel networks. Thus, for the best performance, the interfaces to the memory systems in the SAN must be as fast as possible.

One kind of memory system which is not been widely applied to the SAN environment is non-volatile solid-state memory, such as memory systems using integrated circuit flash memory devices. One reason non-volatile solid state memory is not in wide-spread use arises from the relatively slow processes used for storing data in such devices. It is difficult for a system based on an array of flash memory integrated circuits, for example, to keep up with a high-speed communication channel feeding data.

The current generation of flash memory modules represented by devices such as the Toshiba TC58256FT, generally has a relatively long write period which varies in length over the life of the device from about 200 $\mu$s to as much as 1000 $\mu$s or more per write cycle. Read operations are much faster, but can still take 10 $\mu$s or more. Furthermore, the memory modules have on chip buffers, which accept data bytes at a clock speed up to about 20 MHz for example. Standard bus speeds are generally much faster and carries eight bytes per cycle. For example, the PCI bus operates typically at 33 or 66 MHz and carry 64 bits or 8 bytes per cycle. This means that there cannot be a write to the flash memory module during each bus cycle.

In order to transfer data from a computer bus to flash memory, typically a buffer is used. The buffer is designed to be big enough to hold the data received over the bus as the flash memory write cycles occur. For a representative system using current generation flash memory modules, a 16 KB FIFO buffer is required at the interface between the flash device and a 66 MHz, 64 bit PCI bus. The buffers often require extra board space, and are easily overrun by large data transfer operations.

Thus, this configuration does not permit the flash memory to be used in a sustained transfer of large files at the same speed as the computer bus. Further, if a faster bus is used, the performance of the flash memory becomes progressively worse compared to the capacity of the bus.

Accordingly, what is needed is a method and apparatus for interfacing a high speed bus with a flash memory or other non-volatile solid state memory devices.

SUMMARY OF THE INVENTION

A memory system with an array of non-volatile solid state memory devices including an interface for a high speed bus is described, supporting continuous writes at the bus speed of very large blocks of data, without the possibility of buffer overrun during most conditions.

An apparatus comprises an memory bus, a plurality of interface buffers, an array of non-volatile storage units, such as flash memory devices, and an interconnect system supporting data transfer among the components. The array includes sets and subsets of non-volatile storage units, referred to herein for convenience as platters having multiple banks, banks having multiple columns, and columns having multiple storage units. In one example, the array includes two platters, eight banks per platter, four columns per bank, and eight storage units per column, for a total of 256 storage units. Of course other configurations fall within the present invention using different combinations of units per column, columns per bank, and banks per platter.

The non-volatile storage units each have an input buffer for storing a page of data, and an input port coupled to input pins on the unit and to the input buffer. The page size and the size of the input port can vary, but for example, a page is 256, 512 or 1024 bytes, and the input port can accept one or two 8-bit bytes per storage unit clock cycle.

In one embodiment supporting continuous writes, there are at least N interface buffers f (f=0 to N−1), the interface buffers having a depth of Z cycles, at least N columns c (c=0 to N−1) in each of at least M banks b (b=0 to M−1), and the page buffers in the non-volatile memory units include storage for at least X addresses in a page (i=0 to X−1). Logic in the system employs a process supporting continuous writes comprising writing data to bank b, page address i, and column c in a given input cycle i+c+b+Z from the interface buffer f to column c, for f and c going from 0 to N−1, and then incrementing i, for i going from 0 to X−1, and then incrementing b for b going from 0 to M−1. Z in preferred implementations ranges from 1 to 16.

The memory speed at which the input buffer can accept data can vary. In the following example, a typical speed of 16.5 MHz is used. The non-volatile storage units take a certain write time to store the page of data from the input buffer into the memory. The sets of non-volatile storage units are each coupled to a corresponding interface buffer by a memory bus. The memory bus supplies data from the buffers to the inputs of the non-volatile storage units at the memory speed. The input bus is coupled to the interface buffers to supply them with data. The input bus speed is typically several times faster than the memory speed. For example, the input bus speed might be 66 MHz as compared to a memory speed of 16.5 MHz. The write time for flash memory devices includes a write wait time plus a setup time plus the time to write the number of bytes required. For a column of eight devices with one byte input ports, a bus eight bytes wide can supply data to be written in one storage unit cycle in the column. For a buffer of 512 bytes, 512 storage unit cycles are used to fill the input buffers of the column of devices. Thus, in 512 storage unit cycles, 4192 (4K) bytes are stored in the column to be written into the non-volatile memory. The total time, considering zero wait states, is one storage unit cycle for a command, three cycles for address, 512 cycles for data, and the memory wait time. Thus, this total time ranges, for example, from about 232.182 micro-seconds to 1032.182 micro-seconds, with the bus coupled to the input port busy for 32.182 micro-seconds.

With a 16.5 MHz storage unit clock, 4 interleaved columns are used in each bank to keep up with a 66 MHz PCI bus. This provides for storage of 16K bytes within each 32.182 micro-second per bank interval at the speed of the incoming PCI bus. At the end of the per bank interval, the system switches to the next bank on the platter. The number of banks on the platter is selected so that total write time of, for example, about 250 micro-seconds elapses before the system reverts to the first bank. Multiple platters can be coupled in parallel with logical memory addressing for added memory capacity or in a series to handle longer write times.

The number of non-volatile storage banks in each array is going to be at least as great as the memory write time multiplied by the memory speed divided by the page size. For example, if the memory speed is 16.5 MHz, the page size is 512 bytes and the memory write time is 200 μs, at least seven banks must be provided. More can be provided and in one embodiment, eight banks are used with these clock speed and input buffer parameters.

In one embodiment, the system includes control logic for accepting burst data transfers over the input bus and storing the burst data in the non-volatile storage units.

In one embodiment, the system includes logic for selecting a starting page in the non-volatile storage units to store the data burst.

In one embodiment, the system includes control logic for providing a destination page and control information to the non-volatile storage units.

In one embodiment, the system includes logic for enabling the individual non-volatile storage columns. For example, the first non-volatile storage unit of each of the banks can be enabled or selected.

In one embodiment, the system includes logic for transferring portions of data from the interface buffers to the non-volatile storage columns at every interval of the input bus speed.

In one embodiment, a triple round-robin is used to transfer the data from the plurality of buffers to the non-volatile storage units. The outermost round-robin selects one of the columns in each set. The middle round-robin selects among the entries of the page size of the input buffer in the non-volatile storage units. The innermost round-robin selects one of the banks in the plurality of banks in a round-robin fashion. Then data is transferred from the selected buffer to the selected column.

In one embodiment, the burst data is received in 16,384 data portions each the width of the input bus of, for example, 64 bits per portion.

DETAILED DESCRIPTION

A. System Overview

Figure 1:
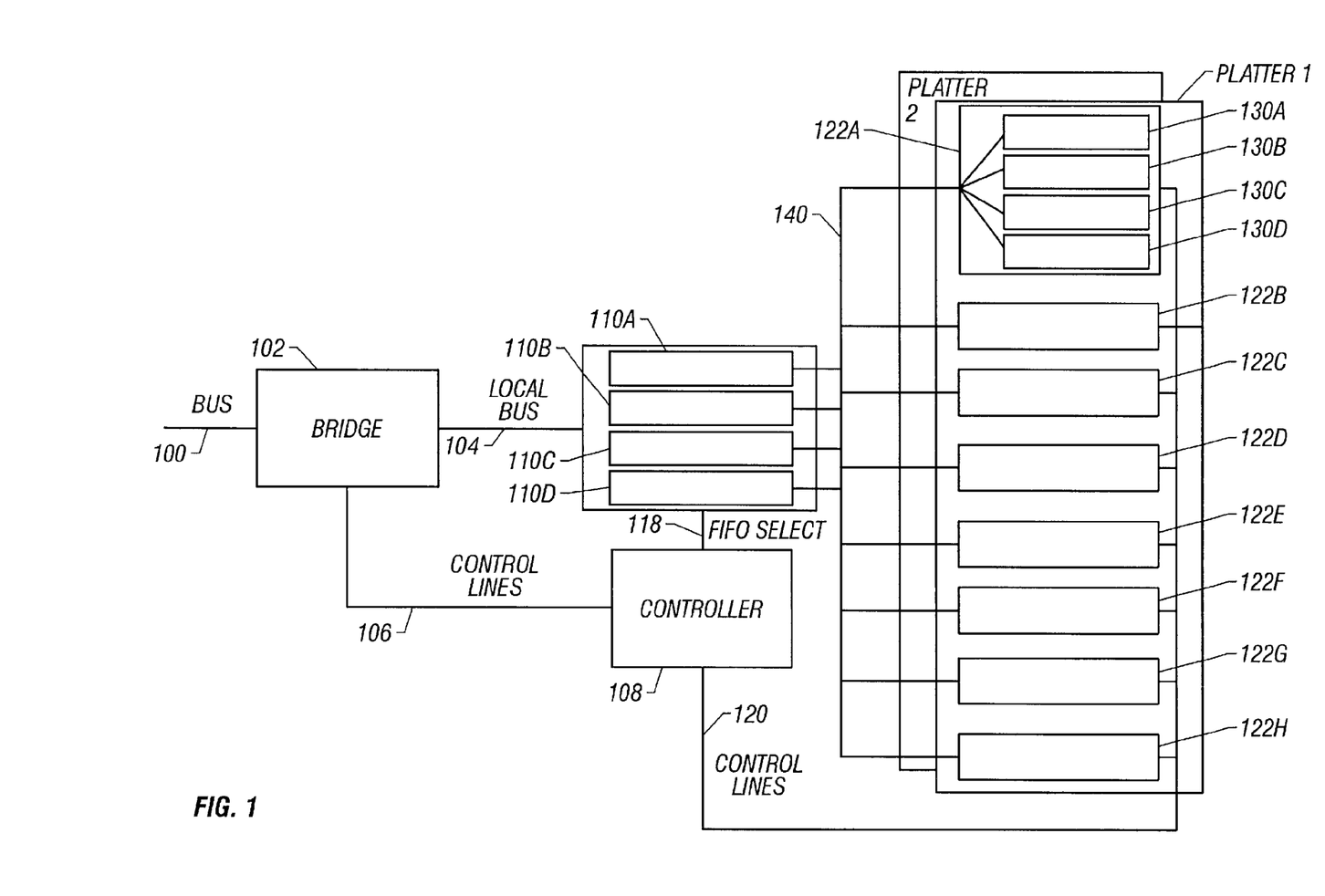
FIG. 1 is a block diagram of an interface between a high speed bus and a non-volatile storage.

FIG. 1 is a block diagram of a memory system including an interface between a high speed bus and an array of non-volatile storage devices. This interface can be used to allow non-volatile storage to match the speed and capacity of a high speed bus such as a PCI bus. FIG. 1 shows the configuration for interfacing flash memory non-volatile storage units operating at 16.5 MHz and a write wait time of over 200 microseconds with a 66 MHz 64 bit wide PCI bus. Types of non-volatile storage other than flash memory can be used. One of the characteristics of non-volatile storage units is that they operate at a slower speed than a high speed computer bus.

This paragraph lists the elements of the system shown in FIG. 1. FIG. 1 includes a high speed bus 100, a bridge chip 102, a local bus 104, a set of control lines 106, a controller 108, first in first out (FIFO) buffers 110A–D, a FIFO select 118, a set of control lines 120, and banks of non-volatile storage units 122A–D. The banks of non-volatile storage units 122A include columns non-volatile storage units 130–132.

The bus is coupled to the bridge chip 102. The local bus 104 couples the bridge chip 102 and the FIFO buffers 110–116D. The set of control lines 106 couples the bridge chip 102 and the controller 108. The controller 108 is coupled to the FIFO buffers 110–116D by the FIFO selected 118. The FIFO buffers 110A–D are coupled to the corresponding banks of non-volatile storage units 122A–D by the bus system 140 operating at the memory unit clock speed (e.g. 16.5 MHz). The FIFO buffers may be as small as one cycle deep, or more preferably, four to sixteen cycles deep to allow for safety against variations in transfer latencies. Each 64 or 66 bit wide buffer 110A–110D is coupled respectively to a corresponding column 130A–130D in the bank B1, and to a corresponding column of units in each of the other banks B2 to B8 in this example. For the 64 bit wide bus embodiment, eight sets of eight bits from the buffer are coupled in parallel to the input ports of the eight memory unit in the column. This way, 64 bits are written in parallel to the eight bit input ports of eight chips, and in 512 such cycles, the input buffers on the chips in the column are filled. The controller then connects the buffers to the next bank.

The bus 100 is a bus such as the 66 MHz 64 bit PCI bus, or some other sort of bus supplying several gigabits per second or more. Data flows over the bus into a bridge chip 102 that decodes the control signals on the bus 100. The bridge chip 102 identifies data on the bus that is to be stored in, or retrieved from, the non-volatile storage. The data can temporarily reside on the bridge chip 102. In some embodiments, the local bus 104 is coupled to a random access memory (not shown), like high speed synchronous dynamic random access memory (SDRAM). This additional memory can provide temporary storage of data prior to the transfer of the data to the flash memory. This additional memory may also be used to maintain a memory map or some other table keeping track of where data is stored in the flash memory.

The data is usually transferred across the bus in data bursts. Each data burst will be comprised of a number of bus size portions of data. In the case of the PCI bus, the data width is 64 bits. Also, the PCI bus can carry two bits of parity information, making the total data width 66 bits if parity information is being stored. In one embodiment, the typical block of data sent in burst mode is 16K bits 16,384 bits in 256 cycles at 64-bits per cycle. If parity is included on the bus 16,896 bits in 256 cycles with two bits of parity are transferred. The two extra bits in one alternative can be buffered in a separate buffer 2 bits by 256 cycles deep. The parity data in this embodiment is transferred to the flash array in 16 cycles extra. Alternatively, the columns and interface buffers can be made 66 or more bits wide, rather than 64, to accommodate real time, continuous parity data transfer.

The controller 108 controls the flow of information from the bridge chip 102 to the sets of flash memory units 122A–D. The controller 108 also maintains a table of where data is stored in the flash memory 122A–D. This can be maintained in the controller 108 or in a memory coupled to the controller 108. The functions of the bridge chip 102 and the controller 108 can be combined. The controller 108 may be a field programmable gate array (FPGA), a microprocessor, or some other type of controller. The controller 108 receives signals from the bridge chip 102 over the set of control lines 106. The set of control lines 106 indicate the operation to be performed. The operations include, for example, read, write, block erase, setup with and without parity, byte access, and idle.

The controller 108 responds to signals sent over the set of control lines 106 by changing the signals on the FIFO select 118 and the set of control lines 120. The controller 108 can enable the inputs to one or all of the FIFO interface buffers 110A–D by altering the signals sent over the FIFO select 118.

In the illustrated embodiment, the non-volatile storage units that comprise the columns (e.g. 130A to 130D) of flash memory units in the banks 122A–122H use the same inputs for addresses, data, and instructions. Therefore, when addresses are being provided from the bridge chip 102, or from some other source, the controller 108 will enable all of the interface FIFO buffers 110A–D. Then, the controller 108 will transfer the address and instruction information to selected columns (130A–130D) that comprise the banks of non-volatile storage units 122A–D from the FIFO buffers 110A–D.

Once the actual data to be written to the non-volatile storage is on the bridge chip 102, the controller 108 round-robins the data into the FIFO interface buffers 110A–D. In this example, the FIFO buffer 110A would get the data from a first input bus cycle after the address information. The FIFO buffer 110B would get the data from a second input bus cycle. The FIFO buffer 110C would get the data from the third input bus cycle. The FIFO buffer 110D would get the data from the fourth input bus cycle and the round-robin would start again at buffer 110A.

At the same time that the controller 108 is performing a round robin on the input from the bridge chip into the FIFO buffers 110A–D, the controller 108 is performing a triple loop process to transfer the data from the front of the FIFO buffers 110A–D into the non-volatile storage across interface system 140. The outermost loop selects among the first to the fourth column 130A–133D. The middle loop is on the number of entries that make up each page of the input buffer of the flash memory module. In this example, the middle loop ranges over the 512 entries in the page, or 528 if parity information is being stored in a separate buffer at the interface. The innermost loop is on the banks 122A–122H.

The triply nested loop structure is such that on each clock period of the clock on the bus 100, one data portion is being transferred to an interface buffer while another is being stored into a non-volatile storage column from a buffer. The one to one, or better mapping of input to output cycles on the buffers 110A to 110D, insures that no overrun condition will happen in normal circumstances, and supports continuous transfer of data from a high speed bus to the flash memory. Further, the FIFO buffers 110A–D do not need to be very large. Because of the arrangement of the non-volatile storage units into sets of non-volatile storage units 122A–D, an entry will be removed from a buffer just as another entry is stored in the buffer. For this reason, the FIFO buffers 110A–D have a depth of 1, constituting a single entry register. In some embodiments, each FIFO buffer has a depth of 16 entries. It is also not necessary to use a FIFO buffer, as other types of buffers can be used. Each entry in the buffer should be capable of carrying the full data width of the bus 100, for example 64 bits of data. If parity information is being preserved, on the 64 bit PCI bus, that would be 66 bits wide, and an extra buffer as mentioned above could be used because the parity would be supplied at the end of the data with additional bus clock cycles.

In the example shown, the banks of non-volatile storage units 122A–H are comprised of four columns (e.g. 130A–130D) of non-volatile storage units. In this example, each column is comprised of eight non-volatile storage units. The non-volatile storage units 130A–130D are part of the set of non-volatile storage units 122A.

Each non-volatile storage unit may be comprised of multiple non-volatile storage elements. One type of non-volatile storage that can be used is flash memory. In one embodiment, Toshiba TC8256FT flash memory elements are used. Each Toshiba TC8256FT flash memory module holds 64M bits, or 8M bytes without parity. In embodiments supporting parity, the chips have additional capacity to store the parity bits. The modules are organized into 16,384 pages of 512 bytes, 528 bytes if parity information is being stored.

The Toshiba TC8256FT flash memory elements receive data 8 bits at a time. For that reason, multiple Toshiba TC8256FT flash memory modules will be grouped to form a single non-volatile storage column capable of holding the full data width of the bus 100. In the case of PCI, there are 64 bits of data; accordingly, each of the columns of non-volatile storage units 130A–130D could be comprised of eight Toshiba TC8256FT flash memory elements. In this configuration, each non-volatile storage column has 64 MB of memory and each bank of non-volatile storage units has 512 MB of memory, for a total storage capacity of 2 GB of flash memory per platter. Depending on the application, larger or smaller flash memory units may be used.

The example shown is for a 66 MHz PCI bus with one type of non-volatile storage units, the Toshiba TC8256FT flash memory module. More generally, the configuration of sets and units can be computed based on the timing characteristics of the bus and the non-volatile storage units used in the system. The minimum number of interface buffers can be computed by using Equation 1.

$$\left\lceil \frac{\text{bus speed}}{\text{memory speed}} \right\rceil \quad (1)$$

The bus speed is the clock speed at which the input bus is running. The memory speed is the clock speed at which the input buffer of the non-volatile storage unit can accept data. For a 100 MHz bus and a non-volatile storage unit with a buffer capable of accepting data at 16.5 MHz, the required number of buffers would be $\lceil 100/16.5 \rceil$, or 7. If the page buffers of the non-volatile storage units could accept data at 20 MHz, the same 100 MHz bus would only require 5 columns. The number of columns of non-volatile storage units in each bank is identical to or greater than the number of interface buffers 110A–110D.

The number of non-volatile storage units in each set can vary based on the characteristics of the non-volatile storage unit and the design specifications. If flash memory is used, there may be different performance characteristics for the non-volatile storage portion of the flash module over the lifetime of the flash memory module. Depending on the application, a different write time should be used to calculate the number of units per set.

In some applications, the average write time should be used. In others, the worst case numbers are more appropriate. For example, the Toshiba TC8256FT flash memory module has a worst case write time of 1000 μs, but an average write time over the useful life of 200 μs. Depending on the application and the length of time that the module will be used, a different write time should be used in designing the configuration of the non-volatile storage. In one embodiment, the average write time is used. In another embodiment, the worst case write time is used.

The minimum number of banks per platter can be computed using Equation 2:

$$\left\lceil \frac{\text{flash write time}}{\text{writes per page} \times \text{flash clock period}} \right\rceil = \left\lceil \frac{\text{flash write time} \times \text{flash clock rate}}{\text{writes per page}} \right\rceil \quad (2)$$

For example, if a 200 μs write time is used for the flash memory units, then given the rate at which the input buffer of the non-volatile storage unit can accept data, 16.5 MHz, and the page size, 512 entries, the number of banks needed can be computed using Equation 2. Here, the computation results in a minimum number of banks of $$\left\lceil \frac{200 \ \mu s \times 16.5 \ \text{MHz}}{512} \right\rceil = \lceil 6.510 \rceil = 7.$$

In this example, eight columns are present in each bank. This is done because the exact number of columns in each bank can be tuned to the application. In one embodiment, the burst data transfer size is 16,384 64-bit portions. By having eight columns of non-volatile storage units in each bank, there are 32 non-volatile storage units total per bank. Each column of non-volatile storage unit has a page buffer that can hold 512 64-bit pieces of information. Therefore, with 32 columns of non-volatile storage units in eight banks, a single page of all of the non-volatile storage units will hold the data burst (512×32=16384). The memory map is also simple with this configuration because a block can be located by a single address, its page number, which is the same in all of the flash memory units. Further, using eight units instead of seven allows a greater tolerance for the flash memory to perform as slowly as approximately 250 μs on write operations.

The Toshiba TC8256FT flash memory elements use only a single set of inputs to provide addressing, instructions, and data to the flash memory module. Accordingly, the set of control lines 120 will not provide address information if the Toshiba TC8256FT flash memory element is used. Instead, the address and instructions are provided over the same inputs that couple the FIFO buffers 110A–D to the non-volatile storage columns 130A–130D. In one embodiment, each block of data comes in 16,384 64-bit data bursts and accordingly an entire data burst is stored on the same page in all of the flash memory units. Thus, the destination page and write instruction can be loaded into all of the FIFO buffers 110A–D with the FIFO select 118 set so that all of the FIFO buffers get the destination page and write instruction. The destination page and write instruction can then be transferred from the FIFO buffers 110A–D to all of the units in the banks 122A–D. Depending upon the configuration of the set of control lines 120, this may require a double loop through all of the columns and all of the banks, or it may be possible to simply loop through all of the buffers and activate all of the columns simultaneously.

B. Banks of Columns of Non-Volatile Storage Units

Figure 2:
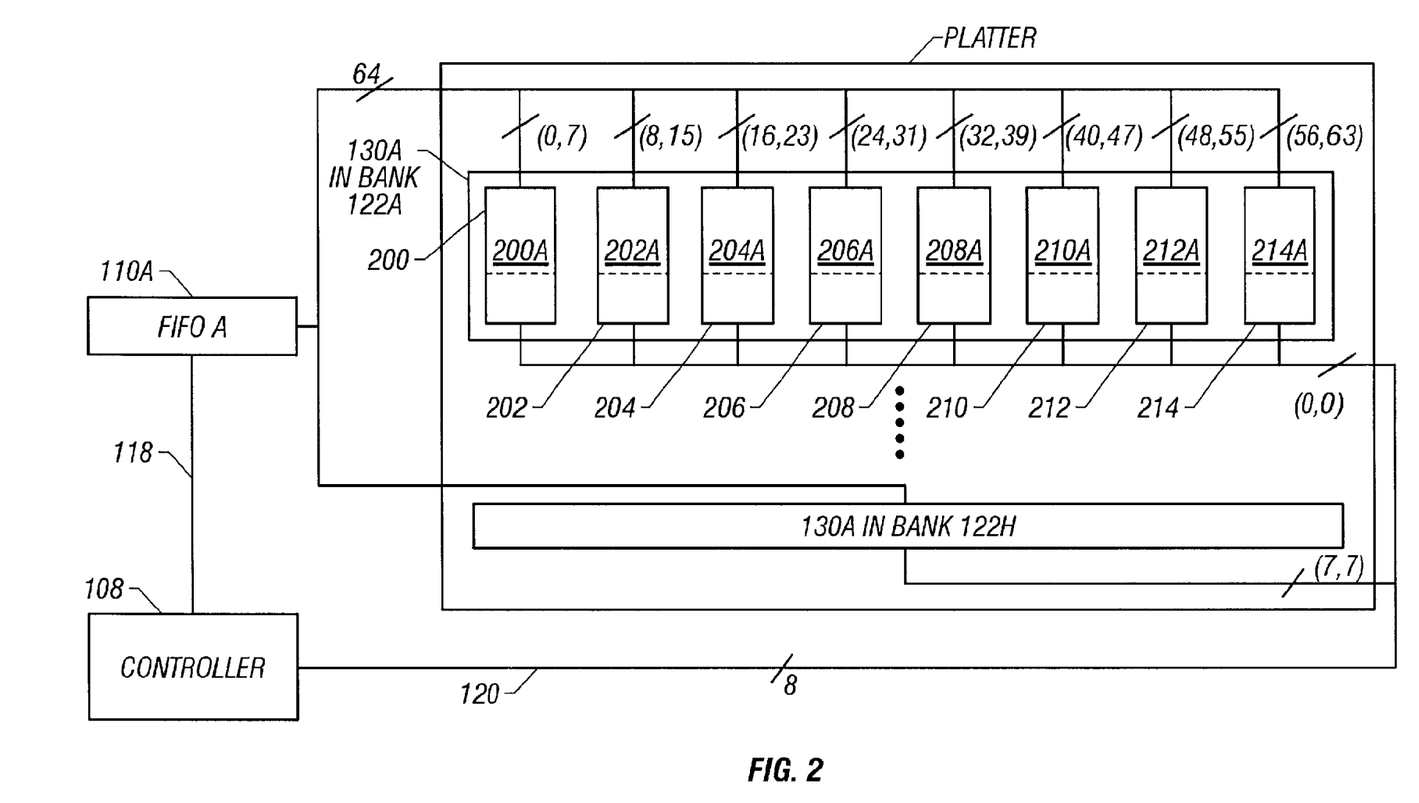
FIG. 2 is a block diagram of an arrangement of a set of non-volatile storage units.

FIG. 2 is a block diagram of an arrangement of a column 130 of non-volatile storage units. FIG. 2 includes a controller 108, FIFO buffer 110A, a FIFO select 118, a set of control lines 120, and a column 130A of non-volatile storage units 200, 202, 204, 206, 208, 210, 212, 214. In each of the eight banks a column (e.g. 230A) corresponding to a single buffer 110A is connected to the buffer. The non-volatile storage column 130A is comprised of eight non-volatile storage elements 200–214. Each of the other interface buffers 110B, 110C, and 110D are connected in a similar fashion to corresponding columns (not shown) in the bank.

The controller 108 is connected to the FIFO buffer 110A by the FIFO select 118. The FIFO buffer 110A is coupled to one non-volatile storage column 130A in each bank by a 64 bit wide bus. The bus lines are then divided across the non-volatile storage elements that make up each column. Bits 0–7 of the bus are coupled to non-volatile storage element 200. Bits 8–15 are coupled to non-volatile storage element 202, and so on. In this fashion, the 64 bit bus is coupled to the eight 8-bit non-volatile storage elements that comprise this non-volatile storage column. The set of control lines 120 are coupled to the chip enable, write enable and other control inputs of the non-volatile storage elements in the column.

Each of the non-volatile storage elements 200–214 is comprised of an input buffer that is capable of storing a page of data and a non-volatile memory. The input buffer is loaded with the data and then the non-volatile memory is written. The input buffer is capable of accepting data at a limited rate. Memory elements such as the Toshiba TC8256FT flash module can accept data at rates up to 20 MHz. With current non-volatile storage units, this process takes a relatively long period such as 250 μwhich is several thousand clock cycles of a clock running at 20 MHz. Other non-volatile memory devices having read while write capability, different page sizes, different input port sizes, and the like can be utilized as well, with appropriate changes in the bus widths and timing.

C. Timing

Figure 3:
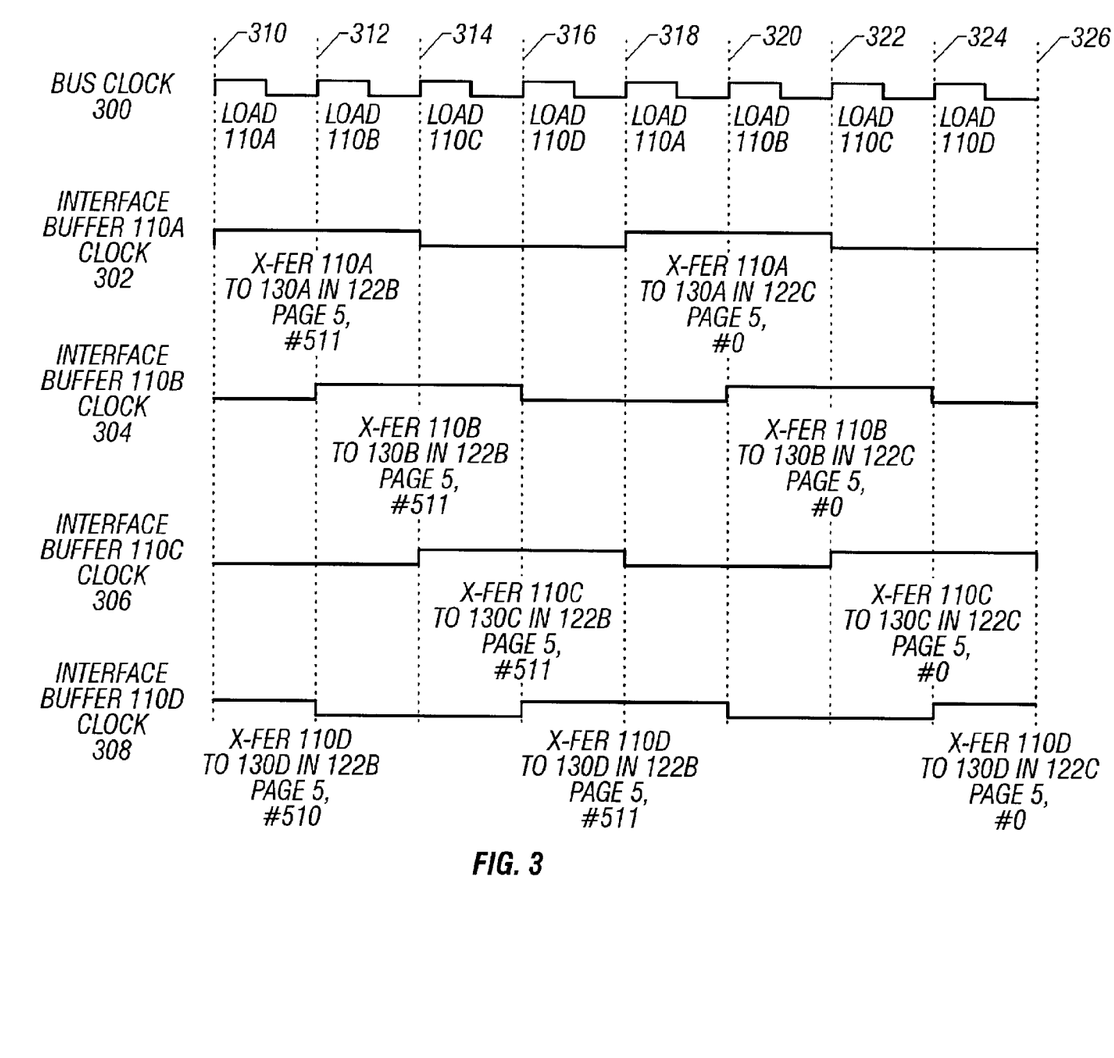
FIG. 3 is a timing diagram showing the relationship between the operation of the high speed bus and the non-volatile storage.

FIG. 3 is a timing diagram showing the relationship between the operation of the high speed bus and the non-volatile storage. FIG. 3 includes a Bus Clock 300, a buffer A clock 302, a buffer B clock 304, a buffer C clock 306, a buffer D clock 308, and reference points 310–326. In this example, the target address is page 5, and the timing shown corresponds to the middle of a transfer.

The bus clock 300 is running at 66 MHz. At each of the reference points 310–326, a portion of the data burst is loaded into one of the four FIFO buffers. At reference point 310, buffer A is loaded. At reference point 312, buffer B is loaded. At reference point 314, buffer C is loaded. At reference point 316, buffer D is loaded, and the process continues from reference points 318–326. The clocks for the buffers are running at 16.5 MHz. The clocks for the buffers each start at the same time as the rising edge of the bus clock 300. However, each of the four buffer clocks starts on a different clock phase so that the buffer clocks 302–308 are each one period of the bus clock 300 off from one another. This enables the buffers to be emptied in a round-robin fashion at the same overall rate as the bus clock 300.

At reference point 310, buffer D clock 308 is in the middle of transferring the byte 510 of page 5 from FIFO buffer D to column D. Prior to reference point 310, the first 509 entries have been loaded into all of the input buffers and stored. Prior to reference point 310, the 510th entry has been placed into the input buffers of the first three columns. By reference point 312, the transfer from FIFO buffer D of the 510th entry to the input buffers of column D will be completed. While the transfer to the input buffer of the non-volatile storage unit is completed, three more cycles are required to finish the storing of the data in the device.

Now, the transfer of the 511th entry can begin. On each of the reference points, 310–316, one entry will be transferred from the corresponding buffer to the 511th entry of the input buffer of the columns.

At reference point 318, the selected bank will change so that the second unit in the platter of non-volatile storage units receives data, in this example also at page 5, but not necessarily so. This is important because, once the entry 511 (assuming no parity) was stored into the input buffer, the page was filled and the input buffer will write out the buffered data to the non-volatile memory.

At reference points 318–324, the first byte of the fifth page of the next bank will be written to the selected non-volatile storage unit in each of the sets from the corresponding buffer.

Because the buffer clocks 302–308 correspond with the bus clock 300, in the case where there is an interrupt on the bus clock 300, the timing of any buffer clocks 302–308 can be held until the interrupt is complete.

D. Setup

Figure 4:
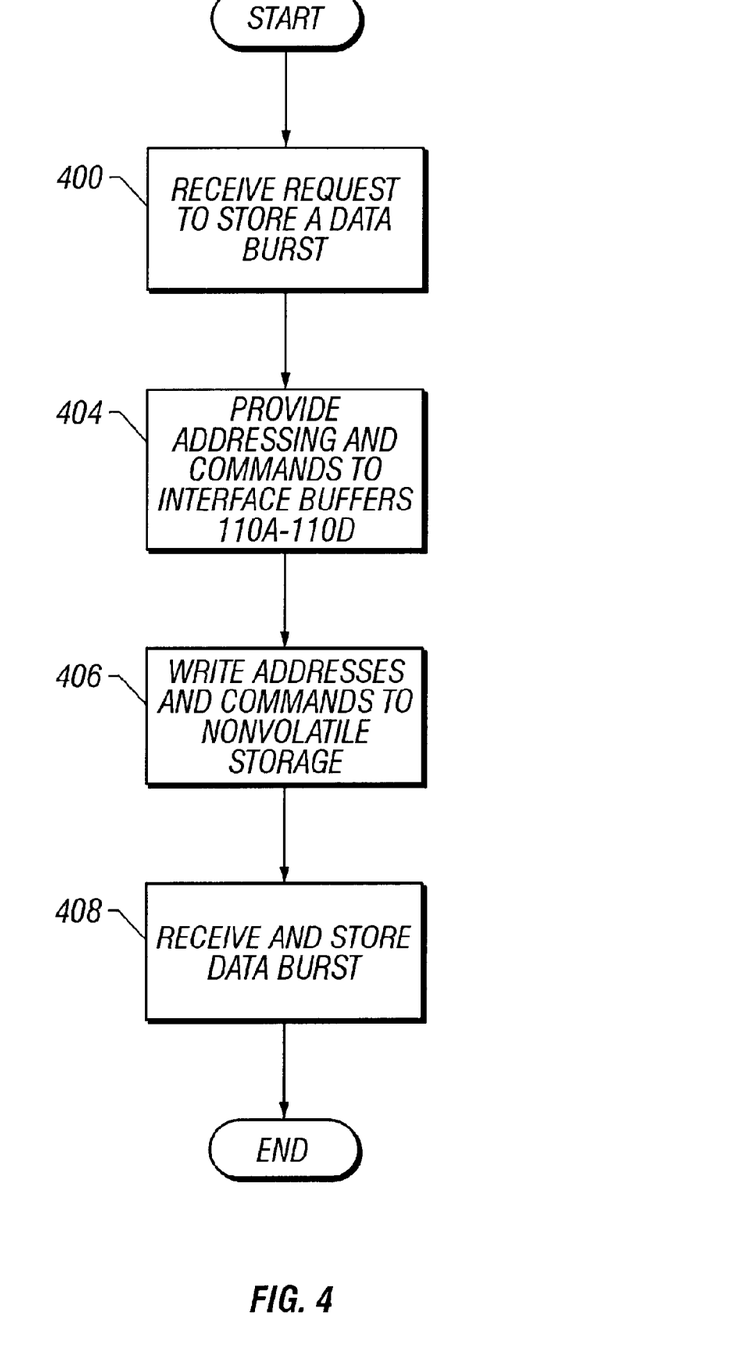
FIG. 4 is a process flow diagram demonstrating a method for interfacing a high speed bus with non-volatile storage.

FIG. 4 is a process flow diagram demonstrating a method for interfacing a high speed bus with non-volatile storage.

The process starts at step 400, where a request is received to store a data burst at a target address. In one embodiment, each data burst is 16,384 64-bit entries. Other data burst sizes can be supported.

Next, at step 404, addressing information and commands are placed in the buffers. The addressing information is the target page. The command is that a page is going to be written. By providing this information to the columns, the input will be prepared to receive data, and when each 64 bit word is received, the input buffers of the non-volatile storage units will begin to write that data to the column. In other embodiments, each non-volatile storage unit has addressing and command lines separate from the data lines. In that case, at step 404, the addressing and commands are provided to the non-volatile storage units themselves and control can proceed at step 408, skipping over step 406.

Next at step 406, the destination address and commands are written to columns. Depending on the configuration of the control lines and the buffers, it may be possible to do this in a single loop through all of the buffers. In other configurations, a double loop between each of the buffers and all of the columns may be required.

Next at step 408, the data burst is received and stored in the columns. Then the "write complete" of the page is verified. This process can be performed by the method of FIG. 5.

The method can also support reading data bursts from the non-volatile storage and placing it on the bus at high speed. The method of FIG. 4 can be used by selecting a read location at step 402 and then loading the data from columns into the buffers and then onto the bus at step 408.

E. Write Process

Figure 5:
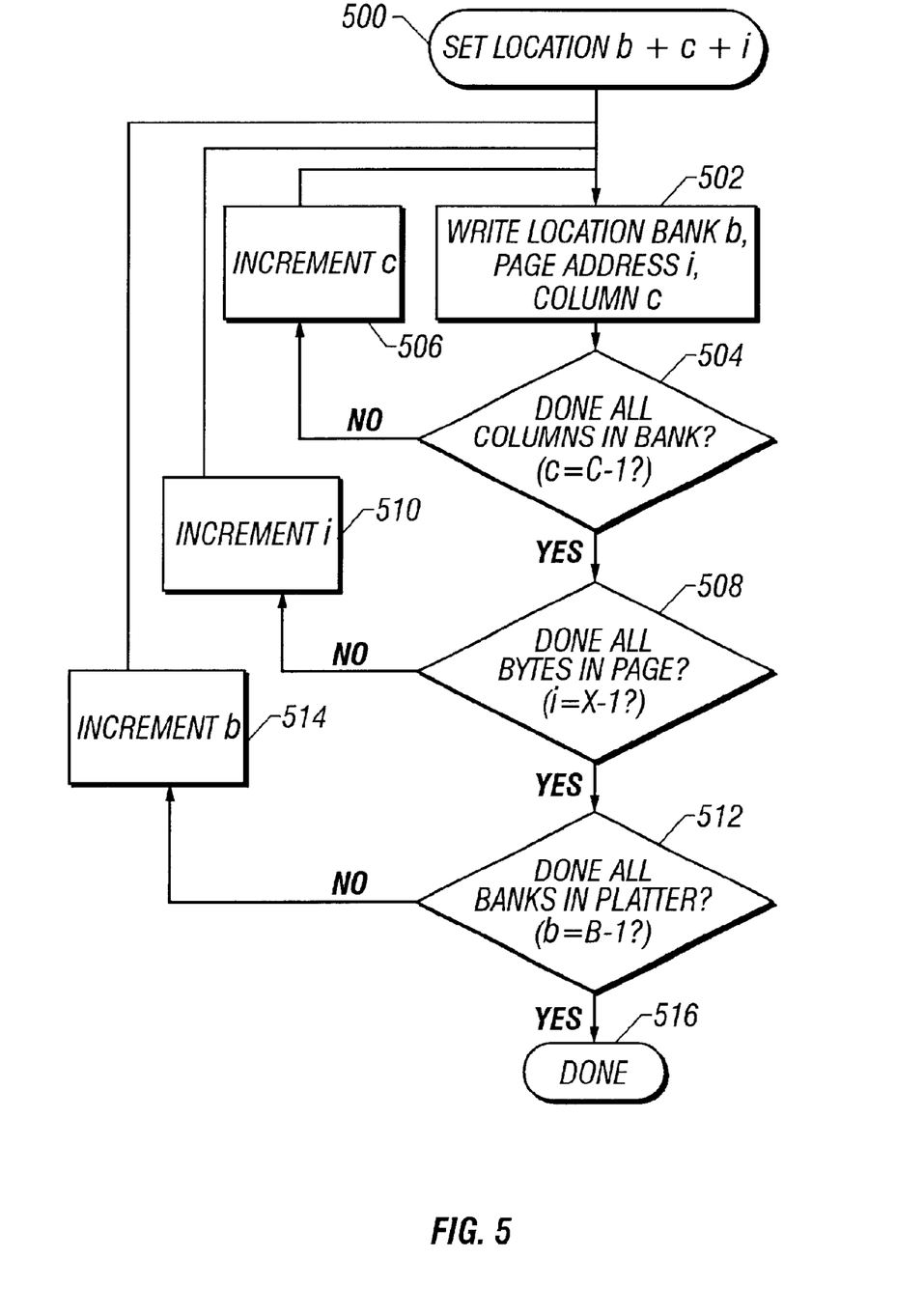
FIG. 5 is a process flow diagram demonstrating a method for storing a data burst to a non-volatile storage.

FIG. 5 is a process flow diagram demonstrating a method for storing a data burst to non-volatile storage. This can be used at step 408 of FIG. 4 to store the data burst into the non-volatile storage.

The process starts at step 500, with an input location set at bank b, column c, page address i. That location is written from the interface buffer f corresponding to column c. Next the algorithm determines whether all columns in the bank had been written (step 504). If they have not all been written, then the algorithm branches to step 506 and increments the column c along with the interface buffer f. The process returns to step 502 to write the updated location. If at step 504, all the columns in the bank had been written, then c is reset and the algorithm determines whether all the bytes in the page had been written (step 508). If all bytes page had not been written, then the algorithm branches to step 510, and increments of the parameter i. It then branches to step 502 to write the updated location. If at step 508, all the bytes in the page had been written, then i is reset and the algorithm determines whether all the banks in the platter have been written (step 512). If at step 512, more banks need to be written, then the algorithm branches to step 514 to increment the bank b. The algorithm then returns to step 502 to write the updated location. If at step 512, all banks had been written, then the process is done (step 516).

This triply looped process enables one entry of information to be moved from the bus to a FIFO buffer for each clock cycle of the bus. The process also allows one entry to be moved from a FIFO buffer to the column each clock cycle. This provides an interface between the bus and the non-volatile storage.

The method can also support reading data bursts from the non-volatile storage and placing it on the bus at high speed. The method of FIG. 5 can be used by reading the next byte from the column into the selected buffer at step 512 and moving the current entry in the selected buffer onto the bus at step 514.

F. Conclusion

Thus, a method and apparatus for interfacing a high speed bus with a non-volatile storage has been described. The apparatus supports matching a high speed bus such as a 66 MHz bus with the much slower flash memory modules that may be used for non-volatile storage to provide throughput equivalent to that of the bus.

The foregoing description of various embodiments of the invention have been presented for purposes of illustration and description. It is not intended to limit the invention to the precise forms disclosed. Many modifications and equivalent arrangements will be apparent.

What is claimed is:

1. An apparatus comprising:

a plurality of banks of non-volatile storage units, each bank having a number of columns of non-volatile storage units, each non-volatile storage unit having an input buffer for storing a page of data, the page having a page size, having an input coupled to the input buffer accepting an input portion of data of a page at a memory speed, the non-volatile storage units storing the data of the page from the input buffer within a memory write time;

a plurality of interface buffers;

an input bus having an input bus speed which is faster than the memory speed, the input bus being coupled to the plurality of interface buffers;

a bus system, connecting each of the plurality of interface buffers to the non-volatile storage units of one of the columns in each of the plurality of banks of non-volatile storage units, supplying data from the plurality of interface buffers to the inputs of the non-volatile storage units at the memory speed; and wherein the plurality of banks consist of a number of banks of non-volatile storage units said number being greater than or equal to the memory write time multiplied by the memory speed divided by the page size and the number of columns in each bank being greater than or equal to the input bus speed divided by the memory speed.

2. The apparatus of claim 1, further comprising control logic for accepting a burst data transfer including a Y-bit word every input bus cycle for a plurality of cycles, over the input bus and storing the Y-bit words of the burst data to the plurality of banks of non-volatile storage units at the input bus speed.

3. The apparatus of claim 2, wherein the control logic further comprises a logic for selecting a starting page in the plurality of sets of non-volatile storage units for storing the data burst.

4. The apparatus of claim 2, wherein the control logic further comprises a logic for providing a destination page and control information to the plurality of banks of non-volatile storage units.

5. The apparatus of claim 2, wherein the control logic further comprises a logic for transferring portions of data from the plurality of interface buffers to the plurality of banks of non-volatile storage units on every interval of the input bus speed.

6. The apparatus of claim 5, wherein there are at least N interface buffers f (f=0 to N−1) having a depth of Z cycles, at least N columns c (c=0 to N−1) in each of at least M banks b (b=0 to M−1), and the input buffers in the non-volatile memory units include storage for at least X input cycles i (i=0 to X−1), and wherein the logic employs a process supporting continuous writes of 16000 input bus cycles or more comprising writing data in a plurality of iterations to bank b, column c, page address i in the array at the input bus speed in a given cycle i+c+b+Z from the interface buffer f, then incrementing f and c, for following iterations in the plurality of iterations for f and c going from 0 to N−1, and then incrementing i, for following iterations in the plurality of iterations for i going from 0 to X−1, and then incrementing b, for following iterations in the plurality of iterations for b going from 0 to M−1.

7. The apparatus of claim 1, wherein the input bus has an input bus data width, and each of the plurality of interface buffers is capable of accepting data the size of the input bus data width, and the parallel combination of the input buffers of the non-volatile storage units in each column are capable of accepting data the size of the input bus data width.

8. The apparatus of claim 7, wherein the input bus data width is 64 bits.

9. The apparatus of claim 7, wherein a burst data transfer is accepted over the input bus for storage in the plurality of sets of non-volatile storage units, and the burst data received in data portions, each data portion being the size of the input data bus data width, and the burst data transfer comprised of 16,384 data portions.

10. The apparatus of claim 1, wherein each column comprises one or more integrated circuit non-volatile storage units.

11. The apparatus of claim 10, wherein each non-volatile storage unit comprises a flash memory device.

12. The apparatus of claim 1, wherein the input bus speed is 66 megahertz (MHz), the memory speed is 16.5 MHz, the page size is 512 Y-bit words, and the memory write time is greater than 100 microseconds.

13. The apparatus of claim 12, wherein the number of interface buffers is four and the number of non-volatile memory banks is eight.

14. A method for storing data from an input bus at an input bus speed to an array of integrated circuit, non-volatile memory devices, the memory devices including input buffers having storage for at least X input cycles (i=0 to X−1) and accepting data at an array speed which is slower than the input bus speed, the method comprising:

arranging the array of integrated circuit, non-volatile memory devices in at least N columns c (c=0 to N−1) in each of at least M banks b (b=0 to M−1);

providing at least N interface buffers f (f=0 to N−1) having a depth of Z cycles coupled to the input bus for receiving data an in input bus cycle and storing the data in interface buffer f at the input bus clock speed for f going from 0 to N−1; and writing data in a plurality of iterations to bank b, column c, page address i in the array at the input bus speed in a given cycle i+c+b+Z from the interface buffer f, then incrementing f and c, for following iterations in the plurality of iterations for f and c going from 0 to N−1, and then incrementing i, for following iterations in the plurality of iterations for i going from 0 to X−1, and then incrementing b, for following iterations in the plurality of iterations for b going from 0 to M−1.

15. The method of claim 14, wherein the array speed is less than one third and greater than one fourth the input bus speed, X is greater than or equal to 256, N is greater than or equal to 4, and M is greater than or equal to 8.

16. The method of claim 14, wherein the input bus has an input bus data width, and each of the N interface buffers is capable of accepting data the size of the input bus data width, and the parallel combination of the input buffers of the non-volatile storage devices in each column are capable of accepting data the size of the input bus data width.

17. The method of claim 16, wherein the input bus data width is 64 bits.

18. The method of claim 16, wherein a burst data transfer is accepted over the input bus for storage in the plurality of sets of non-volatile storage devices, and the burst data received in data portions, each data portion being the size of the input data bus data width, and the burst data transfer comprised of 16,384 data portions.

* * * * *